United States Patent Office 2,771,389
Patented Nov. 20, 1956

2,771,389

COMPOSITION FOR CONTROLLING GROWTH OF FUNGI COMPRISING DICHLORONAPHTHAQUINONE AND BENTONITE SULFUR

Harry W. Dye, Medina, N. Y., assignor to Food Machinery and Chemical Corporation, San Jose, Calif.

No Drawing. Application July 31, 1951,
Serial No. 239,633

5 Claims. (Cl. 167—20)

The present invention relates to compositions for controlling, inhibiting and eradicating fungicidal growths.

The properties and use of colloidal sulfur as a material for controlling, inhibiting and eradicating the growth of fungi are probably best known in connection with the so-called fused bentonite sulfur (Kolodust, Kolospray and Kolofog). The method of manufacturing fused bentonite sulfur and its properties are described in a patent to Banks, No. 1,550,650 issued August 18, 1925. Improvements in the manufacture of this staple fungicide, wherein the proportion of colloidal sulfur is markedly increased, is described in an application for patent of Russo and Les Veaux, Serial No. 162,390 filed May 16, 1950, now Patent No. 2,664,379 issued December 29, 1953.

Certain organic compounds have also been proposed to inhibit, control and, in some instances, eradicate fungi particularly those of the type of scab appearing on the foliage and fruit of apples, pears and the like, and brown rot appearing on stone fruits. Probably the most effective fungicidally of these organics is the chemical compound 2-3 dichloronaphthaquinone (Phygon). This physiologic action is described in U. S. Patent No. 2,349,772 of May 23, 1944 to William P. ter Horst.

While 2-3 dichloronaphthaquinone has served an extremely useful purpose in the control of fungi, it suffers from certain definite disadvantages such as the definite production of erythema on portions of the human skin when in contact therewith; it has also a particular disadvantage in that it is extremely phytotoxic, the specific action being a decrease in the chlorophyll content of foliage; the end result being the production of lighter colored leaves. This phenomenon is commonly referred to as leaf chlorosis.

Another disadvantage which is subject to some control but not complete control, is loss of the 2-3 dichloronaphthaquinone by washing and weathering after application.

It is an object of the present invention to provide a formulation containing finely divided sulfur and 2-3 dichloronaphthaquinone which is more effective in its action than either component alone.

It is also an object of the invention to provide a fungicidal composition containing 2-3 dichloronaphthaquinone which may be used for the control, inhibition or eradication of fungi particularly of the type of scab and brown rot, wherein the application rate of 2-3 dichloronaphthaquinone is considerably less than that which has been heretofore proposed.

It is also a further object of the invention to employ 2-3 dichloronaphthaquinone in conjunction with fused bentonite sulfur, wherein the concentration of 2-3 dichloronaphthaquinone is considerably reduced and therefore the disadvantageous effects of that product considerably minimized in use.

In the broad aspect of the invention, therefore, 2-3 dichloronaphthaquinone is dispersed with a material containing finely divided sulfur, particularly fused bentonite sulfur previously mentioned, and the resultant formulation used for the control, inhibition or eradication of fungi, particularly scab appearing on apples, pears and the like, and brown rot appearing on stone fruits, whether appearing on foliage, on the blossoms, or on the fruit.

The formulations may be used as dusts or as sprays and may be applied at various stages of growth and varying application rates, depending upon the particular demand and characteristics of the fruit and fungus; that is, during bloom and up through the period when primary infection normally occurs in the particular fruit to be controlled.

Since in the control of this type of fungi the application of fungicides is generally employed in spray form, the principles of the invention will be described herein as specifically related to that type of application; that is, wherein a dry wettable formulation is suspended in water and used as an aqueous spray although it will be understood that other formulations may also be applied as dust.

A typical formulation for spraying purposes comprises a dry mix containing from 1 to 3 ozs. of 2-3 dichloronaphthaquinone mixed and blended with from 3 to 4 lbs. of fused bentonite sulfur (Kolofog). It will be noted from the above that the amount of 2-3 dichloronaphthaquinone is reduced from 50 to 75% and the amount of fused bentonite sulfur reduced about 50% over normal formulations using the fungicides singly.

When employing spray applications, a formulation such as described above is used in the relation of about 3½ lbs. of dry formulation in 100 gals. of water. This is then sprayed at the normal or usual application rate, which application rate will be dictated by the type of fungi and the period of growth during which the spray is applied.

Typical field data resulting from the employment of the improved formulation of the present invention are set forth in the table below:

*Table I*

| Material in Lbs. Per 100 Gallons | Average Percent Scab |
|---|---|
| Fused bentonite sulfur 3¼ lbs | 25.3 |
| Fused bentonite sulfur 6 lbs | 12.3 |
| Composition A | 5.4 |
| Composition B | 1.6 |
| Composition C | 1.6 |
| Untreated check | 94.2 |

Compositions A, B and C consisted of spray formulations of bentonite sulfur and 2-3 dichloronaphthaquinone, wherein 3¼ lbs. of fused bentonite sulfur were blended respectively with 1, 2 and 3 ozs. of the 2-3 dichloronaphthaquinone.

The above results show quite strikingly the increase in scab control with practically the elimination of scab in the above test conditions, wherein the results were obtained on McIntosh apples, a fruit very susceptible to scab. The above figures are in contrast to a scab control wherein 2-3 dichloronaphthaquinone was employed at the same application rate in a solution, the concentration of which was 2 ozs. of 2-3 dichloronaphthaquinone in 100 gals. of water wherein the average percent scab was 6.

In a series of comprehensive tests, the results of which are listed below in Table II, carried out upon five varieties of apples and wherein the test results were related to the average results obtainable by application of fused bentonite sulfur, it is interesting to note that the formulations of the present invention gave considerably improved results over the results obtainable with fused bentonite sulfur alone. These results, it will be noted, are the average obtained on a randomized plot of 25 trees containing five varieties of apples, the susceptibility of which to scab varied from one variety to the other and, consequently, the average results obtainable are more reliable than hand-picked results obtainable from one variety only.

Table II

| Plot No. | Fungicide Used Per 100 Gals. Water | Avg. for 5 Varieties Combined Leaf and Fruit Data | | Relative Effectiveness [1] |
|---|---|---|---|---|
| | | Percent Scab | Percent Clean | |
| 1 | 6 lbs. fused bentonite sulfur | 15.02 | 84.98 | 100.0 |
| 2 | 3 lbs. fused bentonite sulfur | 23.48 | 76.52 | 90.04 |
| 6 | 3 lbs. fused bentonite sulfur plus 2 ozs. 2-3 dichloronaphthaquinone. | 2.54 | 97.46 | 114.68 |
| 10 | Check—no treatment | 53.42 | 46.58 | |

[1] Compared with 6 lbs. of fused bentonite sulfur as standard which has been given a value of 100% effectiveness for the purpose of this analysis.

As shown above, the conjoint action of finely divided sulfur in combination with bentonite and with 2-3 dichloronaphthaquinone, is extremely effective in the control of fungi of the type of scab and brown rot.

Additional experimental tests also indicate the effective action of this organic fungicide when in the presence of finely ground sulfur, when the sulfur is ground so that 90% passes 325 mesh. In general, due to the adhesive action imparted to these spray solutions by fused bentonite sulfur and due to the effective action thereof with the organics, considerable quantities of fused bentonite sulfur are also added. The bentonite sulfur when used in the formulation may be from a few percent to 15% or more, and may be as high as 60 or 75%. In general, however, it is believed that the amount of fused bentonite sulfur admixed with the finely divided ground sulfur will be in the neighborhood of 15%, as excellent results are obtained from such formulations.

The following tests were obtained from formulations in which 2-3 dichloronaphthaquinone was added to a blended mixture containing 15% fused bentonite sulfur and 85% of finely divided ground sulfur in which 90% of the sulfur passed through 325 mesh.

These formulations and test data carried out upon apples were as follows:

Table III

| Material in Lbs. Per 100 Gallons | Average Percent Scab |
|---|---|
| 3¼ lbs. of a composition of 85% ground sulfur and 15% fused bentonite sulfur | 31 |
| 3¼ lbs. of a composition of fused bentonite sulfur plus 2 ozs. 2-3 dichloronaphthaquinone | 2.7 |
| Check | 94.2 |

Comparable results are obtainable when employing dusting procedures in the application of dust formulation containing 2-3 dichloronaphthaquinone blended with fused bentonite sulfur as indicated above, or with such formulations containing considerable quantities of finely ground elemental sulfur. As illustrative of the invention, the following example is given wherein the 2-3 dichloronaphthaquinone is blended with finely divided ground sulfur wherein 90% passes 325 mesh and which contains about 15% of fused bentonite sulfur which appears to act in this connection and in conjunction with the finely ground sulfur as a fungicidal additive with dichloronaphthaquinone and in some respects as an adhesive for retaining the fungicide in place after application to the foliage, blossom or fruit.

The data given below is the average percent fruit scab from five orchards on a total of seven varieties of apples so that the data is very representative of the results to be expected in average application upon all types of apples.

The dust in all cases was applied at an average application rate for apples during the season at which regular applications for scab control are made. The dusts in all cases were essentially a base, 85% of which was ground elemental sulfur, 90% of which passed 325 mesh, and 15% of ground fused bentonite sulfur. To this dust, as indicated below, there was added ½%, 1% and 2%, respectively, of 2-3 dichloronaphthaquinone. Current commercial disease control of fruit by dusting is effected with a formulation of inert carrier with 4% of active ingredient. The results were as follows:

Table IV

| Material | Average Percent Scab |
|---|---|
| Base dust | 18.3 |
| ½% dichloronaphthaquinone | 3.2 |
| 1% dichloronaphthaquinone | 1.9 |
| 2% dichloronaphthaquinone | 0.1 |
| Check | 66.1 |

There appears to be little question that formulations of finely divided sulfur, either as ground sulfur, as fused bentonite sulfur or combinations thereof with ground sulfur, to which have been added small amounts of dichloronaphthaquinones, should give in the hands of the average grower, definitely better control of fungi than the standard fused bentonite sulfur, fused bentonite sulfur and sulfur combinations, or dischloronaphthaquinone alone, at correspondingly low dosages.

For purposes of illustrating the invention, test results obtained on apples have been given. Similar results are obtained on all fruits subject to scab and on all stone fruits subject to brown rot.

What is claimed is:

1. A composition for controlling the growth of fungi which comprises 2,3-dichloronaphthaquinone in minor amount blended with bentonite clay carrying colloidal sulfur.

2. A composition for controlling the growth of fungi which comprises finely divided sulfur in major amount and 2,3-dichloronaphthaquinone in minor amount and wherein a part of the finely divided sulfur is carried in bentonite clay as colloidal sulfur.

3. A composition for controlling the growth of fungi which comprises bentonite clay carrying colloidal sulfur in major amount and 2,3-dichloronaphthaquinone in minor amount.

4. A composition for controlling the growth of fungi which comprises a minor amount of 2,3-dichloronaphthaquinone and a major amount of finely divided elemental sulfur and bentonite sulfur.

5. A composition for controlling the growth of fungi which comprises a minor amount of 2,3-dichloronaphthaquinone and a major amount of finely divided elemental sulfur and sufficient bentonite clay carrying colloidal sulfur to adhesively secure the active ingredients of the composition to the locus of application.

References Cited in the file of this patent

UNITED STATES PATENTS

| 1,550,650 | Banks | Aug. 18, 1925 |
| 2,349,772 | ter Horst | May 23, 1944 |

OTHER REFERENCES

Frear: Chemistry of Insecticides, Fungicides and Herbicides, page 51, 2nd edition, New York, Van Nostrand, 1948.

A. M. Kligman et al.: "Studies With New Fungistatic Agents" in Journal of Investigative Dermatology, February 1948.